United States Patent
Farinacci

(12) 
(10) Patent No.: US 6,182,147 B1
(45) Date of Patent: *Jan. 30, 2001

(54) MULTICAST GROUP ROUTING USING UNIDIRECTIONAL LINKS

(75) Inventor: Dino Farinacci, San Jose, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/126,907

(22) Filed: Jul. 31, 1998

(51) Int. Cl.[7] .................................................. G06F 13/42
(52) U.S. Cl. ......................... 709/238; 709/217; 709/221; 370/94.1
(58) Field of Search ..................................... 709/217, 221, 709/228, 238, 250; 370/94.1, 404, 392; 365/49; 379/67

(56) References Cited

U.S. PATENT DOCUMENTS

| | | | |
|---|---|---|---|
| Re. 33,900 | 4/1992 | Howson | 375/365 |
| 4,131,767 | 12/1978 | Weinstein | 370/512 |
| 4,161,719 | 7/1979 | Parikh et al. | 370/510 |

(List continued on next page.)

OTHER PUBLICATIONS

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux," becker @CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Zhang, et al., "Rate–Controlled Static–Priority Queueing," INFOCOM 1993, pp. 227–236.

William Stallings, Data and Computer Communications, pp: 329–333, Prentice Hall, Upper Saddle River, New Jersey 07458, 1997.

*Primary Examiner*—Zarni Maung
*Assistant Examiner*—Khanh Quang Dinh
(74) *Attorney, Agent, or Firm*—Cesari and McKenna, LLP

(57) ABSTRACT

The invention provides a method and system for multicast group routing using unidirectional links. A set of uplink routers and a set of downlink routers provide a primary unidirectional distribution path from a set of sources to a set of destinations. A relatively smaller reverse communication channel is provided between the destinations and the sources. When a destination desires to add itself to, or take itself off, a multicast distribution group, one of the downlink routers acts as a proxy for that destination and so informs the relevant source. The selection of the proxy reporter for downlink routers or the querier for uplink routers does not require bi-directional communication between either of them, respectively.

12 Claims, 2 Drawing Sheets

U.S. PATENT DOCUMENTS

| | | | |
|---|---|---|---|
| 4,316,284 | 2/1982 | Howson | 709/245 |
| 4,397,020 | 8/1983 | Howson | 341/51 |
| 4,419,728 | 12/1983 | Larson | 370/204 |
| 4,424,565 | 1/1984 | Larson | 340/825.5 |
| 4,437,087 | 3/1984 | Petr | 370/405 |
| 4,438,511 | 3/1984 | Baran | 370/352 |
| 4,439,763 | 3/1984 | Limb | 710/4 |
| 4,445,213 | 4/1984 | Baugh et al. | 340/825.5 |
| 4,446,555 | 5/1984 | Devault et al. | 370/405 |
| 4,456,957 | 6/1984 | Schieltz | 370/352 |
| 4,464,658 | 8/1984 | Thelen | 710/4 |
| 4,499,576 | 2/1985 | Fraser | 340/825.5 |
| 4,506,358 | 3/1985 | Montgomery | 370/409 |
| 4,507,760 | 3/1985 | Fraser | 365/221 |
| 4,532,626 | 7/1985 | Flores et al. | 370/438 |
| 4,644,532 | 2/1987 | George et al. | 370/255 |
| 4,646,287 | 2/1987 | Larson et al. | 370/400 |
| 4,677,423 | 6/1987 | Benvenuto et al. | 341/51 |
| 4,679,189 | 7/1987 | Olson et al. | 379/93.31 |
| 4,679,227 | 7/1987 | Hughes-Hartogs | 379/93.05 |
| 4,723,267 | 2/1988 | Jones et al. | 370/396 |
| 4,731,816 | 3/1988 | Hughes-Hartogs | 379/93.31 |
| 4,750,136 | 6/1988 | Arpin et al. | 710/10 |
| 4,757,495 | 7/1988 | Decker et al. | 370/477 |
| 4,763,191 | 8/1988 | Gordon et al. | 348/7 |
| 4,769,810 | 9/1988 | Eckberg, Jr. et al. | 370/236 |
| 4,769,811 | 9/1988 | Eckberg, Jr. et al. | 370/232 |
| 4,771,425 | 9/1988 | Baran et al. | 370/458 |
| 4,819,228 | 4/1989 | Baran et al. | 370/389 |
| 4,827,411 | 5/1989 | Arrowood et al | 707/206 |
| 4,833,706 | 5/1989 | Hughes-Hartogs | 379/93.31 |
| 4,835,737 | 5/1989 | Herrig et al. | 710/103 |
| 4,879,551 | 11/1989 | Georgiou et al. | 340/825.87 |
| 4,893,306 | 1/1990 | Chao et al. | 370/395 |
| 4,903,261 | 2/1990 | Baran et al. | 370/396 |
| 4,922,486 | 5/1990 | Lidinsky et al. | 370/427 |
| 4,933,937 | 6/1990 | Konishi | 370/404 |
| 4,960,310 | 10/1990 | Cushing | 359/888 |
| 4,962,497 | 10/1990 | Ferenc et al. | 713/201 |
| 4,962,532 | 10/1990 | Kasirai et al. | 370/354 |
| 4,965,767 * | 10/1990 | Kinoshita et al. | 451/50 |
| 4,965,772 | 10/1990 | Daniel et al. | 709/224 |
| 4,970,678 | 11/1990 | Sladowski et al. | 707/52 |
| 4,979,118 | 12/1990 | Kheradpir | 701/117 |
| 4,980,897 | 12/1990 | Decker et al. | 375/265 |
| 4,991,169 | 2/1991 | Davis et al. | 370/463 |
| 5,003,595 | 3/1991 | Collins et al. | 709/9 |
| 5,014,265 | 5/1991 | Hahne et al. | 370/236 |
| 5,020,058 | 5/1991 | Holden et al. | 370/474 |
| 5,033,076 | 7/1991 | Jones et al. | 379/88.2 |
| 5,034,919 * | 7/1991 | Sasai et al. | 365/49 |
| 5,054,034 | 10/1991 | Hughes-Hartogs | 375/222 |
| 5,059,925 | 10/1991 | Weisbloom | 331/1 A |
| 5,072,449 | 12/1991 | Enns et al. | 714/776 |
| 5,088,032 | 2/1992 | Bosack | 709/242 |
| 5,095,480 | 3/1992 | Fenner | 370/238 |
| 5,115,431 | 5/1992 | Williams et al. | 370/394 |
| 5,128,945 | 7/1992 | Enns et al. | 714/776 |
| 5,136,580 | 8/1992 | Videlock et al. | 370/403 |
| 5,166,930 | 11/1992 | Braff et al. | 370/235 |
| 5,199,049 | 3/1993 | Wilson | 375/351 |
| 5,206,886 | 4/1993 | Bingham | 375/344 |
| 5,208,811 | 5/1993 | Kashio et al. | 370/351 |
| 5,212,686 | 5/1993 | Joy et al. | 370/417 |
| 5,224,099 | 6/1993 | Corbalis et al. | 370/412 |
| 5,226,120 | 7/1993 | Brown et al. | 709/224 |
| 5,228,062 | 7/1993 | Bingham | 375/344 |
| 5,229,994 | 7/1993 | Balzano et al. | 370/401 |
| 5,237,564 | 8/1993 | Lespagnol et al. | 370/395 |
| 5,241,682 | 8/1993 | Bryant et al. | 709/249 |
| 5,243,342 | 9/1993 | Kattemalalavadi et al. | 370/231 |
| 5,243,596 | 9/1993 | Port et al. | 341/106 |
| 5,247,516 | 9/1993 | Bernstein et al. | 370/468 |
| 5,249,178 | 9/1993 | Kurano et al. | 370/392 |
| 5,253,251 | 10/1993 | Aramaki | 370/394 |
| 5,255,291 | 10/1993 | Holden et al. | 375/362 |
| 5,260,933 | 11/1993 | Rouse | 375/354 |
| 5,260,978 | 11/1993 | Fleischer et al. | 370/216 |
| 5,268,592 | 12/1993 | Bellamy et al. | 307/43 |
| 5,268,900 | 12/1993 | Hluchyj et al. | 370/429 |
| 5,271,004 | 12/1993 | Proctor et al | 370/392 |
| 5,274,631 | 12/1993 | Bhardwaj | 370/238 |
| 5,274,635 | 12/1993 | Rahman et al. | 370/352 |
| 5,274,643 | 12/1993 | Fisk | 370/401 |
| 5,280,470 | 1/1994 | Buhrke et al. | 370/286 |
| 5,280,480 | 1/1994 | Pitt et al. | 370/256 |
| 5,280,500 | 1/1994 | Mazzola et al. | 370/232 |
| 5,283,783 | 2/1994 | Nguyen et al. | 370/222 |
| 5,287,103 | 2/1994 | Kasprzyk et al. | 709/201 |
| 5,287,453 | 2/1994 | Roberts | 340/825.52 |
| 5,291,482 | 3/1994 | McHarg et al. | 370/413 |
| 5,305,311 | 4/1994 | Lyles | 370/390 |
| 5,307,343 | 4/1994 | Bostica et al. | 370/398 |
| 5,309,437 | 5/1994 | Perlman et al. | 370/401 |
| 5,311,509 | 5/1994 | Heddes et al. | 370/397 |
| 5,313,454 | 5/1994 | Bustini et al. | 710/56 |
| 5,313,582 | 5/1994 | Hendel et al. | 370/231 |
| 5,317,562 | 5/1994 | Nardin et al. | 370/428 |
| 5,319,644 | 6/1994 | Liang | 370/452 |
| 5,327,421 | 7/1994 | Hiller et al. | 370/395 |
| 5,331,637 | 7/1994 | Francis et al. | 370/408 |
| 5,345,445 | 9/1994 | Hiller et al. | 370/358 |
| 5,345,446 | 9/1994 | Hiller et al. | 370/358 |
| 5,359,592 | 10/1994 | Corbalis et al. | 370/358 |
| 5,361,250 | 11/1994 | Nguyen et al. | 270/233 |
| 5,361,256 | 11/1994 | Doeringer et al. | 370/402 |
| 5,361,259 | 11/1994 | Hunt et al. | 370/390 |
| 5,365,524 | 11/1994 | Hiller et al. | 370/222 |
| 5,367,517 | 11/1994 | Cidon et al. | 370/376 |
| 5,371,852 | 12/1994 | Attanasio et al. | 370/431 |
| 5,386,567 | 1/1995 | Lien et al. | 370/431 |
| 5,390,170 | 2/1995 | Sawant et al. | 709/245 |
| 5,390,175 | 2/1995 | Hiller et al. | 713/100 |
| 5,394,394 | 2/1995 | Crowther et al. | 370/398 |
| 5,394,402 | 2/1995 | Ross | 370/399 |
| 5,400,325 | 3/1995 | Chatwani et al. | 370/402 |
| 5,408,469 | 4/1995 | Opher et al. | 370/392 |
| 5,416,842 | 5/1995 | Aziz | 370/399 |
| 5,422,880 | 6/1995 | Heitkamp et al. | 709/249 |
| 5,422,882 | 6/1995 | Hiller et al. | 370/352 |
| 5,423,002 | 6/1995 | Hart | 370/352 |
| 5,426,636 | 6/1995 | Hiller et al. | 370/352 |
| 5,428,607 | 6/1995 | Hiller et al. | 370/352 |
| 5,430,715 | 7/1995 | Corabalis et al. | 370/392 |
| 5,430,729 | 7/1995 | Rahnema | 370/109 |
| 5,442,457 | 8/1995 | Najafi | 370/402 |
| 5,442,630 | 8/1995 | Gagliardi et al. | 358/400 |
| 5,452,297 | 9/1995 | Hiller et al. | 370/395 |
| 5,473,599 | 12/1995 | Li et al. | 370/392 |
| 5,473,607 | 12/1995 | Hausman et al. | 370/219 |
| 5,477,541 * | 12/1995 | White et al. | 370/392 |
| 5,485,455 | 1/1996 | Dobbins et al. | 370/255 |
| 5,490,140 | 2/1996 | Abensour et al. | 370/403 |
| 5,490,258 | 2/1996 | Fenner | 711/1 |
| 5,491,687 | 2/1996 | Christensen et al. | 710/7 |
| 5,491,804 | 2/1996 | Heath et al. | 370/253 |
| 5,497,368 | 3/1996 | Reijnierse et al. | 370/392 |
| 5,504,747 | 4/1996 | Sweasey | 370/401 |
| 5,509,006 | 4/1996 | Wilford et al. | 370/401 |
| 5,517,494 | 5/1996 | Green | 345/302 |
| 5,519,704 | 5/1996 | Farinacci et al. | 370/402 |

| | | | |
|---|---|---|---|
| 5,519,858 | 5/1996 | Walton et al. | 707/10 |
| 5,526,489 | 6/1996 | Nilakantan et al. | 709/228 |
| 5,530,963 | 6/1996 | Moore et al. | 709/243 |
| 5,535,195 | 7/1996 | Lee | 370/256 |
| 5,539,734 | 7/1996 | Burwell et al. | 370/352 |
| 5,541,911 | 7/1996 | Nilakantan et al. | 370/922 |
| 5,546,370 | 8/1996 | Ishikawa | 369/77.2 |
| 5,555,244 | 9/1996 | Gupta et al. | 370/397 |
| 5,561,669 | 10/1996 | Lenney et al. | 370/352 |
| 5,583,862 | 12/1996 | Callon | 370/397 |
| 5,586,121 * | 12/1996 | Moura et al. | 370/404 |
| 5,592,470 | 1/1997 | Rudrapatna et al. | 370/320 |
| 5,598,581 | 1/1997 | Daines et al. | 370/408 |
| 5,600,798 | 2/1997 | Cherukuri et al. | 709/232 |
| 5,602,770 * | 2/1997 | Ohira | 365/49 |
| 5,604,868 | 2/1997 | Komine et al. | 710/52 |
| 5,608,726 | 3/1997 | Virgile | 370/244 |
| 5,617,417 | 4/1997 | Sathe et al. | 709/238 |
| 5,617,421 | 4/1997 | Chin et al. | 370/394 |
| 5,630,125 | 5/1997 | Zellweger | 707/103 |
| 5,631,908 | 5/1997 | Saxe | 370/414 |
| 5,632,021 | 5/1997 | Jennings et al. | 710/129 |
| 5,634,010 | 5/1997 | Ciscon et al. | 709/223 |
| 5,638,359 | 6/1997 | Peltola et al. | 370/229 |
| 5,644,718 | 7/1997 | Belove et al. | 370/229 |
| 5,647,002 * | 7/1997 | Brunson | 379/67 |
| 5,659,684 | 8/1997 | Giovannoni et al. | 709/220 |
| 5,666,353 | 9/1997 | Klausmeier et al. | 709/227 |
| 5,673,265 | 9/1997 | Gupta et al. | 709/250 |
| 5,678,006 | 10/1997 | Valizadeh et al. | 370/230 |
| 5,680,116 | 10/1997 | Hashimoto et al. | 342/827 |
| 5,684,797 | 11/1997 | Aznar et al. | 370/432 |
| 5,687,324 | 11/1997 | Green et al. | 370/395 |
| 5,689,506 | 11/1997 | Chiussi et al. | 709/223 |
| 5,694,390 | 12/1997 | Yamato et al. | 370/390 |
| 5,724,351 | 3/1998 | Chao et al. | 370/401 |
| 5,740,097 * | 4/1998 | Satoh | 365/49 |
| 5,742,905 * | 4/1998 | Pepe et al. | 455/461 |
| 5,748,186 | 5/1998 | Raman | 523/139 |
| 5,748,617 | 5/1998 | McLain, Jr. | 370/230 |
| 5,754,547 | 5/1998 | Nakazawa | 709/250 |
| 5,790,809 * | 8/1998 | Holmes | 709/228 |
| 5,802,054 | 9/1998 | Bellenger | 370/401 |
| 5,809,415 * | 9/1998 | Ayanoglu et al. | 370/94.1 |
| 5,835,710 * | 10/1998 | Nagami et al. | 709/250 |
| 5,841,874 * | 11/1998 | Kempke et al. | 713/160 |
| 5,854,903 | 12/1998 | Morrison et al. | 709/249 |
| 5,856,981 | 1/1999 | Voelker | 714/712 |
| 5,892,924 | 4/1999 | Lyon et al. | 709/245 |
| 5,898,686 | 4/1999 | Virgile | 370/381 |
| 5,903,559 | 5/1999 | Acharya et al. | 370/355 |
| 6,006,264 * | 12/1999 | Colby et al. | 709/226 |
| 6,038,594 * | 3/2000 | Puente et al. | 709/217 |

* cited by examiner

MULTICAST GROUP ROUTING USING UNIDIRECTIONAL LINKS

BACKGROUND OF THE INVENTION

1. Field of the Invention

This invention relates to multicast packet routing.

2. Related Art

In a computer network, it is often desirable to transmit messages from a single source to a selected plurality of destinations. This activity is often referred to as "multicast routing." It is further desirable for the plurality of destinations to be capable of self-selection, so as to add themselves to, or to take themselves off, multicast distribution groups.

One method in the known art is the IGMP (Internet Group Management Protocol), in which messages are transmitted from a single source to a plurality of destinations, and in which destination devices can add themselves to, or take themselves off, multicast distribution groups. One problem with IGMP is that it uses bi-directional communication between routing devices (that receive messages from the source device) and the destination devices, so that routing devices intermediate between the source and destinations can determine how to route multicast messages. IGMP is not well suited when a primary communication path between the source and the destinations is unidirectional, such as in distribution systems using satellite communication.

Accordingly, it would be desirable to provide a method and system for multicast group routing using unidirectional links. This advantage is achieved in an embodiment of the invention in which a set of uplink routers and a set of downlink routers provide a unidirectional distribution path from a set of sources to a set of destinations, and in which some (but not all) downlink routers act as proxies for others to inform uplink routers whether distribution should occur over that unidirectional distribution path.

SUMMARY OF THE INVENTION

The invention provides a method and system for multicast group routing using unidirectional links. A set of uplink routers and a set of downlink routers provide a primary unidirectional distribution path from a set of sources to a set of destinations. A relatively smaller reverse communication channel is provided between the destinations and the sources. When a destination desires to add itself to, or take itself off, a multicast distribution group, one of the downlink routers acts as a proxy for that destination and so informs the relevant source. The selection of the proxy does not require bi-directional communication between either uplink routers or downlink routers.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
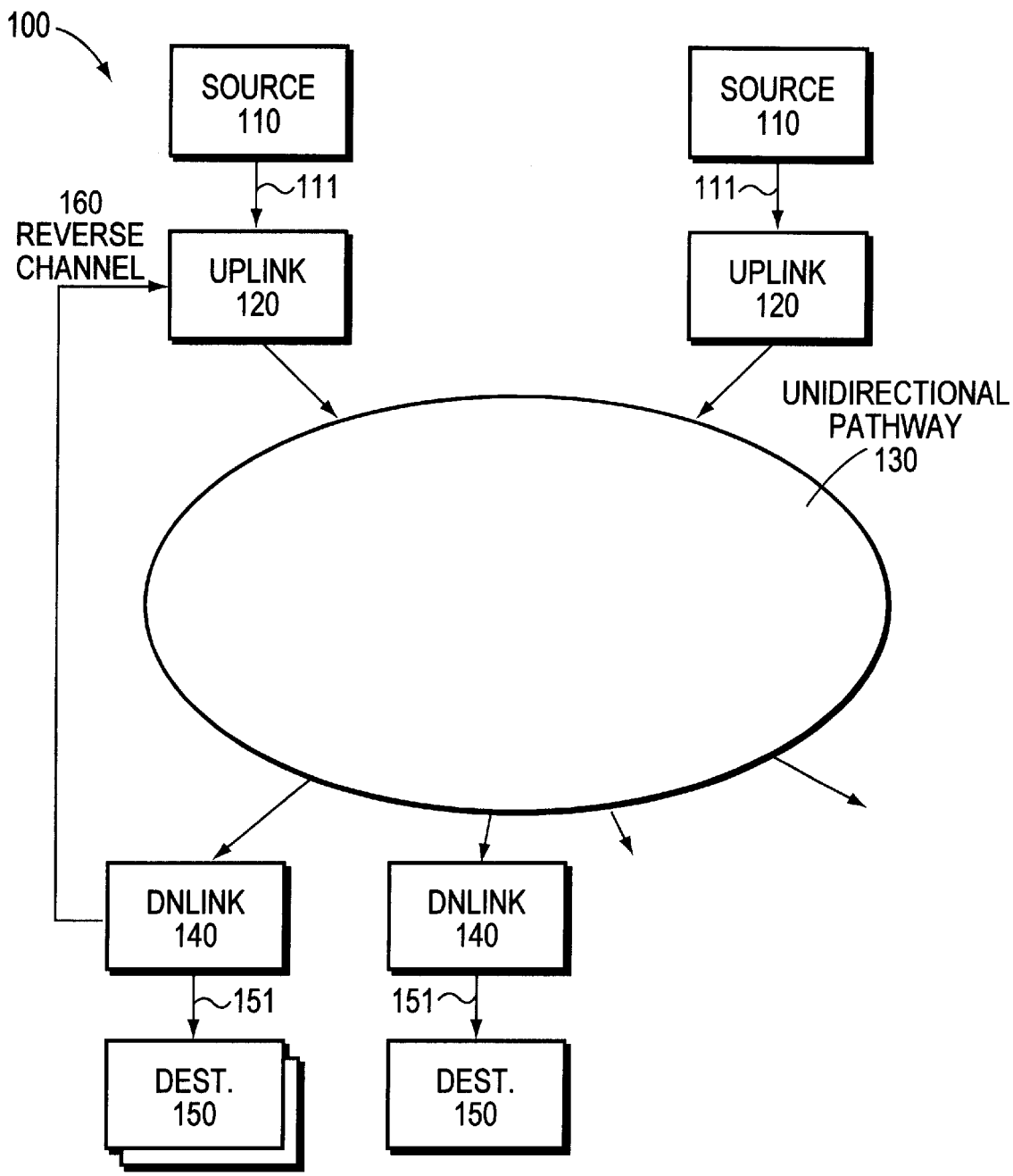
FIG. 1 shows a block diagram of a system for multicast group routing using unidirectional links.

FIG. 1 shows a block diagram of a system for multicast group routing using unidirectional links.

A system 100 includes a set of source devices 110, a set of uplink routers 120, a unidirectional communication pathway 130, a set of downlink routers 140, a set of destination devices 150, and a reverse communication channel 160.

As used herein, a "source device" includes any device taking on the role of a source in a multicast environment. There is no particular requirement that the source devices 110 must be individual devices; they can each be a single device, a set of cooperating devices, a portion of a device, or some combination thereof.

Similarly, as used herein, a "destination device" includes any device taking on the role of a destination in a multicast environment, such as using IGMP or a similar protocol. There is no particular requirement that the destination devices 150 must be individual devices; they can each be a single device, a set of cooperating devices, a portion of a device, or some combination thereof.

Each source device 110 is coupled to an uplink router 120 using a communication pathway 111, such as a direct communication link, a LAN (local area network), a WAN (wide area network), a network using IP (such as the internet), or some combination thereof. Each source device 110 is associated with an uplink router 120, and is disposed for bi-directional communication with its associated uplink router 120.

Each uplink router 120 is coupled to the unidirectional communication pathway 130 and is disposed for transmitting messages using the unidirectional communication pathway 130. Each uplink router 120 is also disposed for receiving messages using the reverse communication channel 160 or using a (relatively limited) reverse communication capability of the unidirectional communication pathway 130.

An uplink router 120 can be coupled to more than one unidirectional communication pathway 130 if the system 100 includes more than one unidirectional communication pathway 130. In this case, the uplink router 120 identifies multicast messages sent using one of the unidirectional communication pathways 130 to indicate which uplink router 120 and which unidirectional communication pathway 130 is being used.

An uplink router 120 can also perform a unicast communication protocol that doe s not require bi-directional communication, using the unidirectional communication pathway 130.

The unidirectional communication pathway 130 is disposed for communicating messages from uplink routers 120 to downlink routers 140.

In a preferred embodiment, the unidirectional communication pathway 130 comprises a satellite communication system, the uplink routers 120 comprise uplink transmitters in the satellite communication system, and the downlink routers 140 comprise downlink transmitters in the satellite communication system. Thus, each uplink transmitter is disposed for transmitting, but not necessarily for receiving; similarly, each downlink transmitter is disposed for receiving, but not necessarily for transmitting.

Each downlink router 140 is coupled to the unidirectional communication pathway 130 and is disposed for receiving messages using the unidirectional communication pathway 130.

The unidirectional communication pathway 130 is described herein as being disposed for communicating messages from uplink routers 120 to downlink routers 140, and the invention does not rely on any other capability of the unidirectional communication pathway 130. However, there is no particular requirement that the unidirectional communication pathway 130 is limited to that capability. For example, the unidirectional communication pathway 130 can have a relatively limited capability for communication in a reverse direction, and thus serve as part of or in cooperation with the reverse communication channel 160.

For example, in an embodiment where the unidirectional communication pathway 130 comprises a satellite communication system, it is possible for uplink routers 120 and downlink routers 140 to be co-located or logically coupled, so that a single device can have both capabilities and possibly perform both functions. Similarly, it is possible for some of the source devices 110 and some of the destination devices 150 to be co-located or logically coupled, so that 3 single device can have both capabilities and possibly perform both functions.

Each destination device 150 is coupled to a downlink router 140 using a communication pathway 151 similar to the communication pathway 111. Each destination device 150 is similarly associated with a downlink router 140, and is disposed for bi-directional communication with its associated downlink router 140.

A reverse communication channel 160 couples each downlink router 140 to each uplink router 120, so that the downlink routers 140 can send messages to the uplink routers 120. In a preferred embodiment, the reverse communication channel 160 is similar to the communication pathway 111.

The reverse communication channel 160 can also be unidirectional (in the reverse of the unidirectional communication pathway 130), but there is no particular requirement that the reverse communication channel 160 be either bi-directional or unidirectional.

The reverse communication channel 160 need not have a particularly wide bandwidth, as the number, frequency, and size of messages to be transmitted using the reverse communication channel 160 is expected to be relatively minor. However, there is no particular requirement that the reverse communication channel 160 be either fast or slow, or wide bandwidth or narrow bandwidth.

Method of Operation

Figure 2:
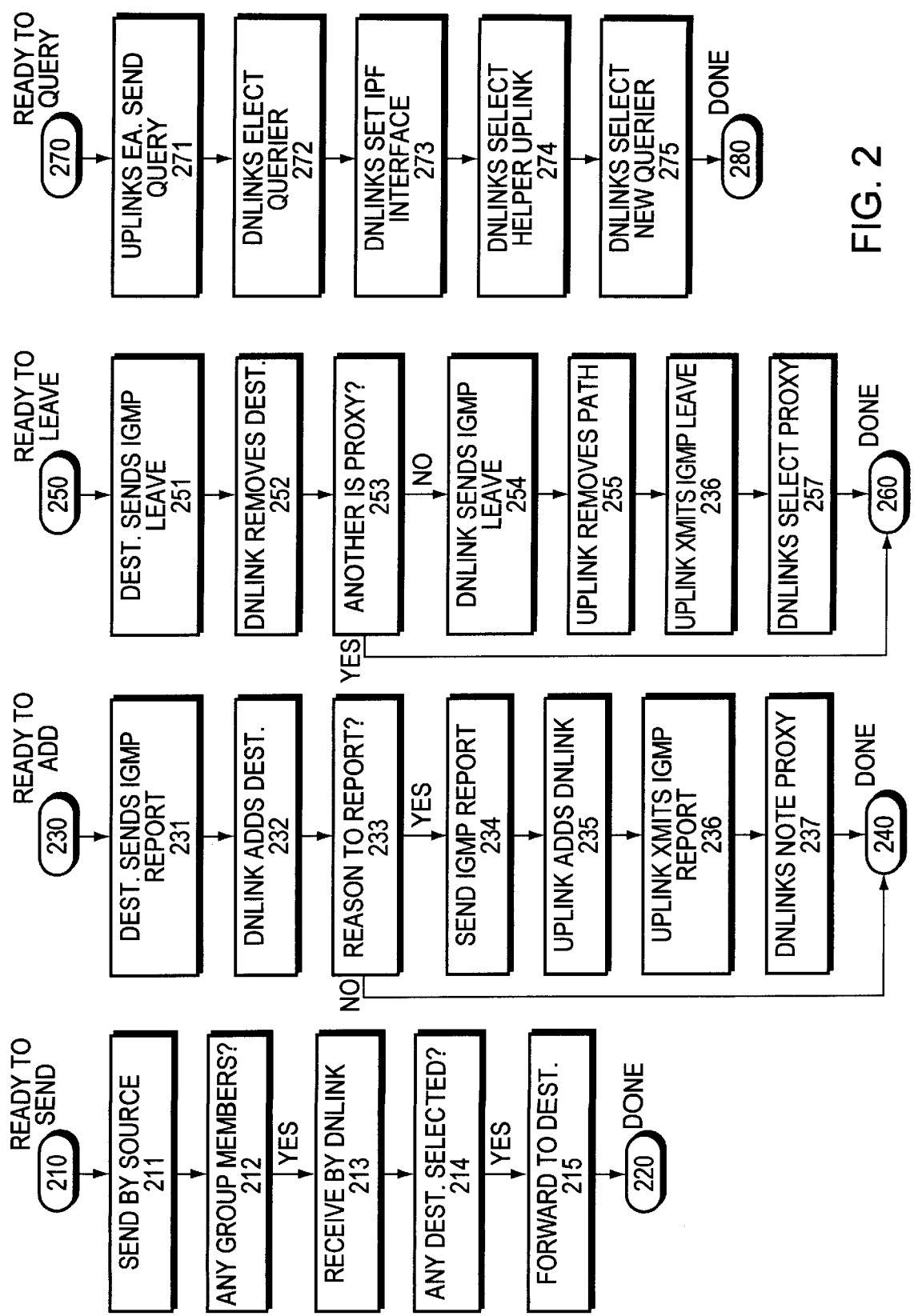
FIG. 2 shows a process flow diagram for a method of operating a system for multicast group routing using unidirectional links.

FIG. 2 shows a process flow diagram for a method of operating a system for multicast group routing using unidirectional links.

A method 200 is performed by the system 100, including the source devices 110, the uplink routers 120, the unidirectional communication pathway 130, the downlink routers 140, the destination devices 150, and the reverse communication channel 160.

Transmitting Multicast Messages

At a flow point 210, one of the source devices 110 is ready to send multicast messages to selected destination devices 150.

At a step 211, one of the source devices 110 sends a message to its associated uplink router 120 for multicast distribution.

At a step 212, the associated uplink router 120 determines if there are any destination devices 150 that are group members associated with the group that is the target for the message and coupled to associated downlink routers 140. If so, the associated uplink router 120 transmits the message using the unidirectional communication pathway 130.

At a step 213, the downlink routers 140 receive the multicast message using the unidirectional communication pathway 130. Each particular downlink router 140 determines if there are any destination devices 150 that are group members associated with the group that is the target for the message, and associated with that particular downlink router 140. Each particular downlink router 140 discards the message if it does not have any such associated destination devices 150.

At a step 214, each downlink router 140 determines if it has one or more associated destination devices 150 that are selected for receipt of the multicast message.

At a step 215, each downlink router 140, forwards the multicast message to those associated destination devices 150 selected for receipt, if any.

At a flow point 220, the multicast messages have been delivered to selected destination devices 150.

Adding Destinations to Multicast Groups

At a flow point 230, one particular destination device 150 is ready to add itself to a multicast group.

At a step 231, the destination device 150 sends an IGMP Report message (that is, a request to be added to a multicast group), to its associated downlink router 140.

At a step 232, the associated downlink router 140 adds the particular destination device 150 to its distribution list for that group.

At a step 233, the associated downlink router 140 determines if there is any reason for it to report the addition to the multicast group. There is no reason for the associated downlink router 140 to make any report for either of the following conditions:

The uplink router 120 is already transmitting multicast message for the indicated group. or The downlink router 140 is already receiving and distributing multicast messages for the indicated group.

These two conditions are functionally the same. There is also no reason for the associated downlink router 140 to report the addition if another downlink router 140 is already a proxy reporter for the indicated multicast group.

In any of these cases where no action is required, the associated downlink router 140 takes no further action, and the method 200 proceeds with the flow point 240. If not, the method 200 proceeds with the next step.

At a step 234, the associated downlink router 140 sends an IGMP Report message to the uplink router 120 associated with that multicast group, using the reverse communication channel 160.

In a preferred embodiment, the downlink router 140 sending the IGMP Report message uses an IP address for the uplink router 120 as the destination IP address for the uplink router 120. The destination IP address is not equal to the IP address for the interface the uplink router 120 has to the unidirectional communication pathway 130. Thus, the IGMP Report message is transmitted using the reverse communication channel 160. In the IGMP Report message, the downlink router 140 includes its own IP address for the unidirectional communication pathway 130 as the source IP address for the IGMP Report message.

In a preferred embodiment, the uplink router 120 should be configured so that all downlink routers 140 coupled thereto using the unidirectional communication pathway 130 are on the same subnet.

At a step 235, the associated uplink router 120 receives the IGMP Report message and adds the interface the uplink router 120 has to the unidirectional communication pathway 130 to its distribution list for the multicast group. The uplink router 120 can determine which such interface to a unidirectional communication pathway 130 to use in response to the source IP address in the IGMP Report message. Thereafter, the uplink router 120 receives and distributes messages for that multicast group using the unidirectional communication pathway 130.

At a step 236, the associated uplink router 120 transmits the IGMP Report message using the unidirectional communication pathway 130. All downlink routers 140 thus receive a copy of the IGMP Report message.

At a step 237, each downlink router 140 note that the downlink router 140 that initiated the IGMP Report message is the proxy reporter for all IGMP Report messages for that multicast group.

At a flow point 240, the particular destination device 150 has been added to the multicast group.

Removing Destinations from Multicast Groups

At a flow point 250, one particular destination device 150 is ready to leave a multicast group.

At a step 251, the destination device 150 sends an IGMP Leave message (that is, a request to leave a multicast group), to its associated downlink router 140.

At a step 252, the associated downlink router 140 removes the output interface associated with the particular destination device 150 from its distribution list for that group if there are no more group members associated with that output interface. If not, the associated downlink router 140 takes no further action, and the method 200 proceeds with the flow point 260. If so, the method 200 proceeds with the next step.

At a step 253, the associated downlink router 140 determines if another downlink router 140 is already a proxy reporter for the indicated multicast group. If so, the downlink router 140 takes no further action, and the method 200 proceeds with the flow point 260. If not, the method 200 proceeds with the next step.

At a step 254, the associated downlink router 140 sends an IGMP Leave message to the uplink router 120 associated with that multicast group, using the reverse communication channel 160.

At a step 255, the uplink router 120 associated with that multicast group, after a (relatively small) period of time, removes the unidirectional interface if no other downlink router 140 sends an IGMP Report message (thus becoming a new proxy reporter).

At a step 256, the uplink router 120 transmits the IGMP Leave message using the unidirectional communication pathway 130. All downlink routers 140 thus receive a copy of the IGMP Leave message.

At a step 257, each downlink router 140 determines that the proxy reporter for that multicast group is no longer performing that function. As a consequence, another one of the downlink routers 140 is selected as a proxy reporter. This occurs when the next downlink router 140 sends an IGMP Report message. It is expected that the next downlink router 140 to be selected as the proxy reporter will be randomly distributed among the downlink routers 140.

At a flow point 260, the particular destination device 150 has left the indicated multicast group.

IGMP Query Messages

At a flow point 270, the uplink routers 120 are ready to send IGMP Query messages.

At a step 271, each uplink router 120 sends an IGMP Query message, using the unidirectional communication pathway 130. Each uplink router 120 does not receive the IGMP Query messages sent by each other uplink router 120.

At a step 272, each downlink router 140 receives the IGMP Query message, and notes the status of a single elected uplink querier.

At a step 273, each downlink router 140 sets its RPF interface, for all sources, in response to the IGMP Query message sent by the elected uplink querier. However, the unicast interface is not Necessarily the same interface as the multicast interface between each particular downlink router 140 and each particular uplink router 120.

At a step 274, each downlink router 140 selects one of the uplink routers 120 as the destination for IGMP helpered reports.

In a preferred embodiment, each downlink router 140 selects the uplink routers 120 with the lowest IP address as the elected uplink querier. However, in alternative embodiments, other techniques could be used that each downlink router 140 can determine individually and that result in consensus among the downlink routers 140 as to which uplink router 120 should be the elected uplink querier.

At a step 275, when the downlink routers 140 each determine that any uplink router 120 is no longer sending IGMP Query messages (such as due to a service interruption or configuration charge), each such downlink router 140 selects a new elected uplink querier for each multicast group.

At a flow point 280, the IGMP Query messages have been processed.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, comprising the following steps:

transmitting multicast messages from a set of sending devices to a set of uplink routers;

transmitting said multicast messages from said set of uplink routers to a set of downlink routers, using a substantially unidirectional communication path;

transmitting said multicast messages from said set of downlink routers to a set of destination devices; and altering distribution of said multicast messages from said set of sending devices to said set of destination devices using a multicast group management protocol, said steps for altering including communicating protocol messages from said set of downlink routers to said set of uplink routers using a reverse communication path, said reverse communication path having substantially less bandwidth than said substantially unidirectional communication path, wherein one of said downlink routers acts as a proxy for said set of downlink routers, the altering of the distribution of the multicast messages also involving changing a membership status of at least one destination device in the set of destination devices, the membership status being with regard to membership in at least one of a plurality of multicast message destination groups, the changing of the membership status being initiated by transmission by the one destination device to one downlink router associated with the one destination device of a request to change the membership status, the one downlink router reporting the request to one uplink router associated with the group, unless at least one predetermined condition exists, via the reverse communication path.

2. A method according to claim 1, wherein the condition comprises the one uplink router already transmitting multicast messages associated with the group.

3. A method according to claim 1, wherein the condition comprises the one downlink router already receiving and distributing multicast messages associated with the group.

4. A method according to claim 1, wherein the condition comprises another downlink router being a proxy reporter for the group.

5. A method, comprising the following steps:
transmitting multicast messages from a set of sending devices to a set of uplink routers;
transmitting said multicast messages from said set of uplink routers to a set of downlink routers, using a substantially unidirectional communication path;
transmitting said multicast messages from said set of downlink routers to a set of destination devices; and
altering distribution of said multicast messages from said set of sending devices to said set of destination devices using a multicast group management protocol, said steps for altering including communicating protocol messages from said set of downlink routers to said set of uplink routers using a reverse communication path, said reverse communication path having substantially less bandwidth than said substantially unidirectional communication path, wherein one of said uplink routers acts as an elected querier for said set of uplink routers, the altering of the distribution of the multicast messages also involving changing a membership status of at least one destination device in the set of destination devices, the membership status being with regard to membership in at least one of a plurality of multicast message destination groups, the changing of the membership status being initiated by transmission by the one destination device to one downlink router associated with the one destination device of a request to change the membership status, the one downlink router reporting the request to one uplink router associated with the group, unless at least one predetermined condition exists, via the reverse communication path.

6. A method according to claim 5, wherein the condition comprises the one uplink router already transmitting multicast messages associated with the group.

7. A method according to claim 5, wherein the condition comprises the one downlink router already receiving and distributing multicast messages associated with the group.

8. A method according to claim 5, wherein the condition comprises another downlink router being a proxy reporter for the group.

9. A system comprising:
a receiver that receives multicast messages transmitted from uplink routers via a substantially unidirection communication path;
a transmitter that transmits the messages received from the uplink routers to destination devices; and
the system being able to effect an alteration in distribution of the messages to the destination devices using a multicast group protocol, the system effecting the alteration by communicating protocol messages to the uplink routers using a reverse communication path having substantially less bandwidth than said substantially unidirectional communication path, the alteration involving changing a membership status of at least one destination device, the membership status being with regard to membership in at least one of a plurality of multicast message destination groups, the changing of the membership status being initiated by transmission by the one destination device to the system of a request to change the membership status, the system reporting the request to one uplink router associated with the group, unless at least one predetermined condition exists, via the reverse communication path.

10. A system according to claim 9, wherein the condition comprises the one uplink router already transmitting multicast messages associated with the group.

11. Apparatus comprising:
means for receiving multicast messages transmitted from uplink routers via a substantially unidirection communication path;
means for transmitting the messages received from the uplink routers to destination devices; and
means for effecting an alteration in distribution of the messages to the destination devices using a multicast group protocol, the system effecting the alteration by communicating protocol messages to the uplink routers using a reverse communication path having substantially less bandwidth than said substantially unidirectional communication path, the alteration involving changing a membership status of at least one destination device, the membership status being with regard to membership in at least one of a plurality of multicast message destination groups, the changing of the membership status being initiated by transmission by the one destination device to the system of a request to change the membership status, the system reporting the request to one uplink router associated with the group, unless at least one predetermined condition exists, via the reverse communication path.

12. Apparatus according to claim 11, wherein the condition comprises the one uplink router already transmitting multicast messages associated with the group.

* * * * *